UNITED STATES PATENT OFFICE.

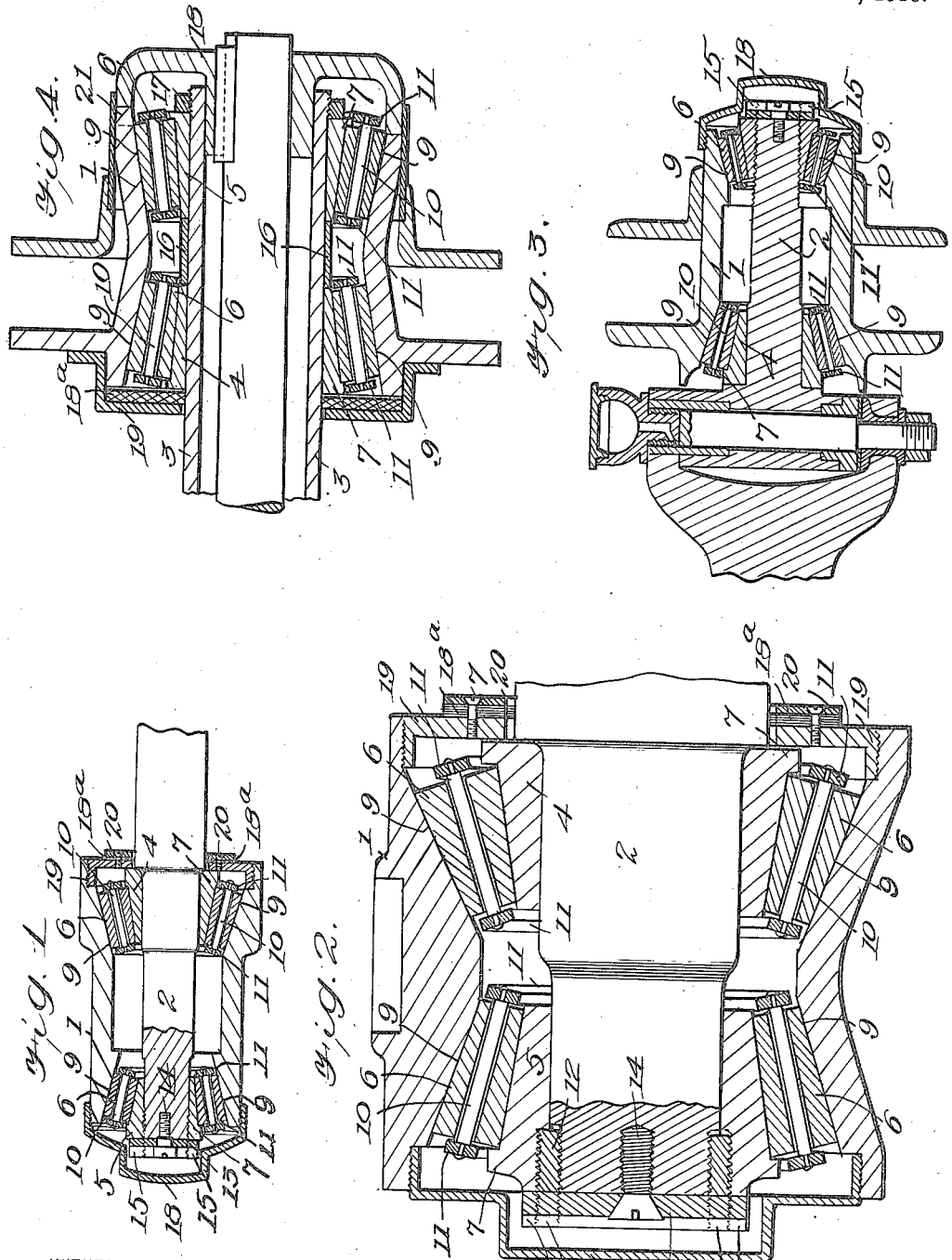

NATHAN GOLD KIMBERLEY, OF TOTTENHAM, ENGLAND.

ROLLER-BEARING.

1,169,652.       Specification of Letters Patent.      Patented Jan. 25, 1916.

Application filed November 18, 1914. Serial No. 872,764.

*To all whom it may concern:*

Be it known that I, NATHAN GOLD KIMBERLEY, a subject of the King of Great Britain, and a resident of Tottenham, in the county of Middlesex, England, have invented a new and Improved Roller-Bearing, of which the following is a specification.

This invention relates to roller-bearings of the kind comprising two sets of hollow tapered rollers which run within an outer casing or the like on correspondingly tapered outer and inner paths associated with an axle or the like, one of which inner roller paths may be adjusted relatively thereto, the rollers of each set being mounted on pins the ends of which engage rings constituting a cage or frame for the rollers.

In the present invention the outer paths for the hollow tapered rollers are of hard metal or surface hardened metal forming part of the outer casing or the bearing so as to withstand the action of the rollers in a more efficient manner than heretofore.

The invention is embodied in the construction and combination of parts hereinafter described and illustrated in the accompanying drawings, in which—

Figure 1 is a longitudinal vertical section of a bearing suitable for carts, carriages and other road vehicles. Fig. 2 is a view similar to Fig. 1 showing a bearing suitable for railway and tramway vehicles. Figs. 3 and 4 are also views similar to Fig. 1 showing, respectively, bearings suitable for the front and back axles of motor driven vehicles.

Like reference numerals denote similar parts in the several figures of the drawings.

The bearing comprises an outer casing 1, hub or the like into or through which an axle 2 or the like passes. The axle 2, or as shown in Fig. 4, a relatively fixed tubular member 3, through which the axle passes, is provided with two tapered inner roller beds or paths 4 and 5, for corresponding sets of hollow tapered rollers 6 to run on. The path 4 may either be formed on or rigidly connected to the axle 2, or similarly associated with the said tubular member 3, and the path 5 is formed separately from the axle, or from the said tubular member, but is capable of being adjusted relatively thereto. A circular flange 7 or the like is formed on or connected to the roller paths 4, 5 at the outer ends thereof, as heretofore, so as to retain the sets of rollers 6 in their respective paths. The said rollers also run on correspondingly tapered outer paths or beds 9, 9 forming part of the outer casing 1, the material of which said paths is made being of sufficient hardness, or surface hardened, so that the surfaces of said paths are able to withstand the action of the hollow tapered rollers 6 in a more efficient manner than heretofore. The casing 1 may be made in one or more parts to suit requirements.

Each set of rollers is mounted on pins 10 between two rings 11 which are fixed at suitable distances apart and constitute a cage or frame for each set of rollers which are maintained thereby in such a manner that while they are free to rotate on the pins 10 they are kept apart and are only in contact with the said inner and outer roller paths, as will be well understood. Certain or all of the pins 10 may be riveted as usual at their ends to insure that the rings 11 are maintained at their proper distance apart.

The inner adjustable roller path 5 may be in screw threaded engagement with the axle 2, as shown in Figs. 1 and 3, or in screw-threaded engagement with a ferrule 12 similarly engaged with the end of the axle 2, as shown in Fig. 2, and the inner roller paths 4, 5 may be maintained at their proper distance apart by means of a locking device comprising a cross bar 13 or the like secured to the end of the axle 2 by means of a screw 14 and entering radially disposed recesses 15 formed in the outer end of the roller path 5, as shown in Figs. 1 and 3, or formed in the outer ends of the roller path 5 and the ferrule 12, as shown in Fig. 2. A second screw may be passed through the cross bar 13 and secured to the end of the axle 2 to insure that movement of the cross bar will take place relatively to the axle.

In the construction shown in Fig. 4, an annular distance piece 16 mounted on the tubular member 3 is disposed between the roller paths 4, 5 to keep them at their required distance apart, and a nut 17 threaded on to the end of the tubular member 3 engages the outer end of the roller path 5.

In order to exclude dust from the bearing, as heretofore, a cap 18 may be provided at the outer end thereof, while at the opposite end, as shown in Figs. 1, 2 and 4, a washer 18ª made of felt or other suitable material may also be provided, said washer being held between a cover 19 and a plate 20, as shown in Figs. 1 and 2, and between the end of the bearing and a cover, as shown in Fig. 4. The cap 18 shown in the latter figure is keyed to the axle 2 and is in driving engagement at 21 with the outer casing of the bearing.

I claim:—

In a roller bearing of the type indicated, the combination with the axle and a tapered bed or roller path applied thereto and a screw threaded ferrule which is in engagement with both the axle and roller path, the said ferrule and roller path having end recesses, of a locking device consisting of a cross bar which projects into the said recesses and a screw securing said cross bar to the axle, as described.

NATHAN GOLD KIMBERLEY.

Witnesses:
J. D. SPRUNT,
HOLBROOK BONNEY.